Aug. 25, 1959     E. B. PASSOW     2,901,551
EYEGLASS HEARING AID
Filed May 19, 1958
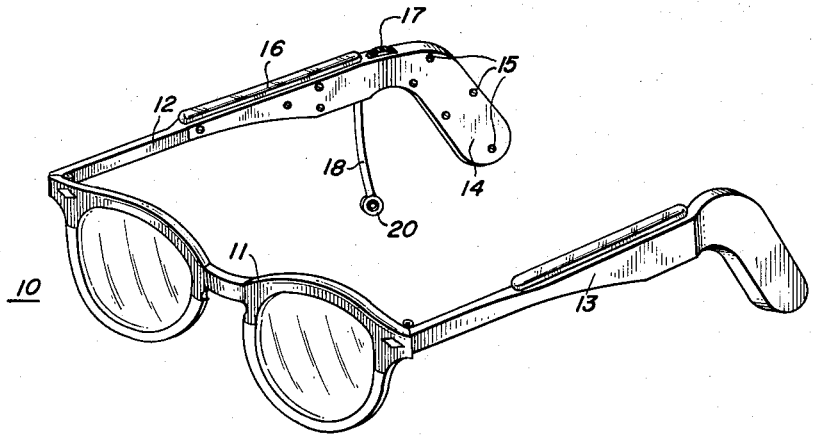
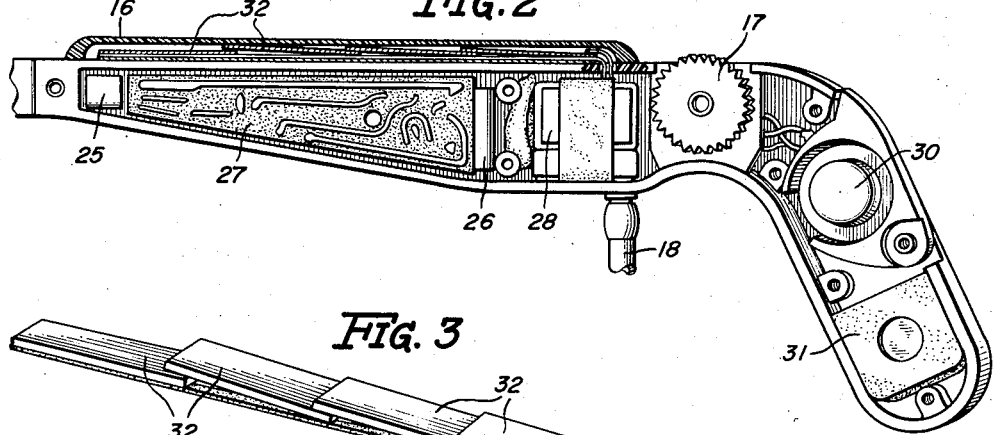
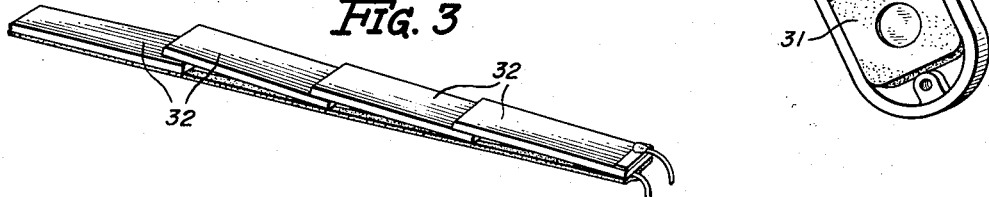
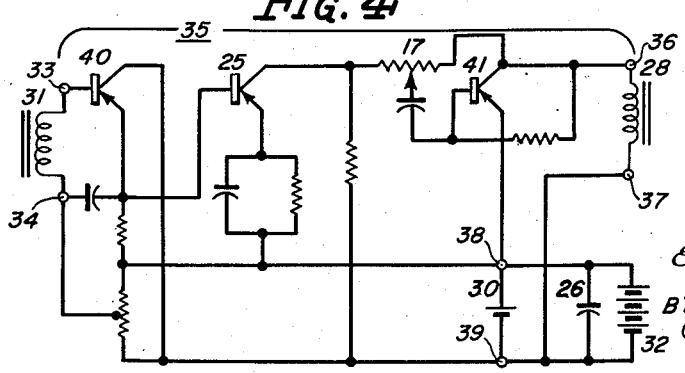
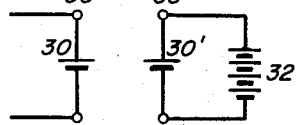
INVENTOR
Edward B. Passow
BY Francis W. Crotty
ATTORNEY

United States Patent Office
2,901,551
Patented Aug. 25, 1959

2,901,551

EYEGLASS HEARING AID

Edward B. Passow, Park Ridge, Ill., assignor to Zenith Radio Corporation, a corporation of Delaware Application May 19, 1958, Serial No. 736,244

7 Claims. (Cl. 179—107)

This invention is directed to eyeglass hearing aids and more particularly to such hearing aids arranged for operation from a conventional battery or for operation from light cells independently of the battery supply.

It is well known to produce combination spectacle frame and hearing-aid structures in any of a variety of constructions. For example, in one construction the hearing-aid components are included within a modular unit or units and affixed either to the side temple bows between the frontal piece and the ear, or joined to the extremities of the temple bows behind the ears. In another construction the hearing-aid components are enclosed within the confines of the temple bows themselves. This latter construction has become practical by virtue of the enormous strides in the field of miniaturization of electrical and electronic components such as transistors, resistors, condensers and the like.

Progress has also been made in reducing the volume occupied by batteries of the type conventionally used to energize an eyeglass hearing aid. For example, a rechargeable nickel-cadmium cell of modest dimensions has been produced. It is understandable that the reduction in volume of such cells necessarily reduces battery life, or the operating time of a nickel-cadmium cell before re-charging is required. It has been suggested that such batteries be removed for re-charging or connected to charging means while the battery is supported within the hearing aid. Neither of these suggestions has found favor with the user of such hearing aids. The users are reluctant to deprive themselves of both visual and audible assistance if the eyeglass hearing aid is to be removed for re-charging, and they are even more reluctant to connect an additional apparatus to the eyeglass hearing aid for charging the battery while wearing the hearing aid. Manifestly, it is desirable to provide some means of charging the batteries and alternatively, to energize eyeglass hearing aids without a conventional battery, without depriving the user of either audible or visual assistance, and without making the hearing aid more conspicuous by utilizing external charging means connected to the eyeglass hearing aid.

It is an object of this invention to provide an eyeglass hearing aid characterized by the fact that the aid may be powered by means other than a conventional battery supply.

It is another object of the invention to provide an eyeglass hearing aid which includes a conventional battery power supply plus means for simultaneously charging the conventional battery and independently energizing the hearing aid.

In accordance with the invention, a combined eyeglass hearing aid comprises a spectacle frame, including a frontal piece for supporting eyeglass lenses and a pair of side temple bow members attached to the frontal piece, for supporting the hearing aid components. A re-chargeable battery is mounted within one of the temple bow members for providing an operating potential. A solar cell is mounted on an exposed surface of one temple bow member and is connected in parallel with the battery. The solar cell develops an electrical operating potential in response to incident actinic radiation and recharges the usual battery during intervals in which the aid is exposed, for example, to sun light.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

Figure 1 is a perspective illustration of an eyeglass hearing aid constructed in accordance with the invention;

Figure 2 is a side illustration, partly in section, of the interior of one portion of the device shown in Figure 1;

Figure 3 is a perspective illustration of certain elements shown in section in Figure 2;

Figure 4 is a simplified schematic diagram useful in understanding the operation of the invention; and Figure 5 is a partial schematic diagram depicting another embodiment of the invention.

In Figure 1 the eyeglass hearing aid 10 includes a spectacle frame comprising a frontal piece 11 for supporting the eyeglass lenses and a pair of side temple bow members 12 and 13 attached in conventional manner to frontal piece 11. It is understood that the various electrical components for the hearing aid may be carried within one or both of the temple bow members 12 and 13. When the components are distributed between both members, they are readily interconnected by conductive leads (not shown) which extend from one temple bow, through the frontal piece, to the other temple bow, as illustrated in the copending applications of Raymond T. Christensen, filed November 21, 1955, Serial No. 548,133, entitled "Hearing Aids," and of Gilbert E. Gustafson et al., filed January 26, 1956, Serial No. 561,416, also entitled "Hearing Aids," now Patent No. 2,856,466, issued October 14, 1958, both of which are assigned to the assignee of the present invention. For purposes of this explanation, however, it is assumed that all of the hearing-aid components except the one which translates the sound output to the user's ear are carried within the temple bow member 12.

The temple bow member 12 includes a hollow portion which is closed by a cover piece 14 maintained in place by a plurality of removable locking screws 15. A transparent shielding element 16, which may be formed of clear acetate or a similar material, is positioned on an exposed surface of temple bow member 12; element 16 will be described more fully hereinafter. A portion of the volume control 17 extends above temple bow member 12. The sound conducting tube 18, terminating in a nozzle 20, is connected to the earphone within the hollow portion of member 12. The nozzle 20 is adapted for connection to an earmold (not shown) which fits the ear of the hearing-aid wearer.

In Figure 2 the temple bow member 12 is shown with cover plate 14 removed. Within the hollow portion of member 12 are disposed those conventional circuit elements which constitute an electronic hearing aid; for convenience some of the elements are not illustrated in the drawing. Among those typical elements shown are one transistor 25 of the several transistors in the amplifying circuit, an electrolytic capacitor 26, a printed circuit board 27, earphone 28, sound-conducting tube 18, volume control 17, a conventional energizing battery 30, and the microphone 31. One or more sound-transmitting apertures are disposed adjacent microphone 31 in the surface of temple bow 12 not visible in Figure 2, to admit sound waves to the microphone. The remaining transistors and other circuit elements not visible in Figure 2 are disposed in the hollow portion of member 12 behind printed circuit board 27.

In accordance with the invention a solar cell 32 is positioned under the shield 16 on an exposed surface of temple bow member 12; the configuration of cell 32 is shown in Figure 3. Because shield 16 is transparent, solar cell 32 is effectively positioned on an exposed surface of member 12. The construction and operation of solar cell 32 will be described in greater detail hereinafter.

The schematic diagram of Figure 4 depicts a multi-stage transistor amplifier circuit which is entirely conventional except for the addition of solar cell 32 and electrolytic capacitor 26. The microphone 31 is coupled to the input terminals 33 and 34 of a multi-stage transistor amplifier 35. Coupled in series between input terminals 33 and 34 and the amplifier output terminals 36 and 37 are transistor 40, transistor 25, volume control 17, and transistor 41. The emitters of transistors 40, 25, and 41 are coupled to the positive terminal 38 of the power supply terminals 38 and 39. The collectors of the transistors are coupled to the negative terminal 39, and a conventional battery 30 is coupled between terminals 38 and 39. This battery may be a re-chargeable nickel-cadmium 1.25 volt cell, or a similar re-chargeable cell, which is now commercially available.

In operation, sound waves are translated by microphone 31 into electrical signals, which are amplified in transistors 40 and 25. A portion of the signal output from transistor 25, dependent upon the setting of volume control 17, is amplified in transistor 41 and coupled to earphone 28. Earphone 28 converts the electrical signal into sound waves, which are then translated through tube 18 (Figure 1) and nozzle 20 to the earmold (not shown) of the user.

In accordance with the invention, solar cell 32 is connected to the power supply terminals 38 and 39, and thus is in parallel with battery 30. "Solar cell," as used herein, designates a battery comprising one or more photovoltaic cells. Such cells produce at their terminals a predetermined potential responsive to the incidence of natural or artificial light waves, and these cells even respond to infrared energy. For purposes of this specification and the appended claims, the term "actinic radiation" is deemed to include both natural and artificial light waves and energy in the infrared portion of the frequency spectrum.

To be energized by actinic radiation, it is evident that the solar cell must be mounted on an exposed surface of either temple bow or upon the frontal piece. The cell can be effectively exposed and still protected by a clear shielding element 16, which formed of clear acetate or a similar substance, does not restrict the passage of such radiation. Both cell 32 and shield element 16 may be fixedly mounted, or may be positioned for ready detachment and attachment to the temple bow member 12 at the desire of the hearing aid user.

To obtain the maximum utility from the actinic radiation to which an average wearer is exposed, the eyeglass hearing aid should not be shielded by clothing or hair. For example, a male wearer who invariably wears a hat will prevent the passage of some radiation to the solar cell when the cell is mounted on an upper surface of the temple bow. Likewise, a female wearer whose hair arrangement includes long hair in the vicinity of the ear would also prevent the cell of the illustrated embodiment from operating at maximum utility. To obviate these disadvantages the male user can provide a hat with apertures in the brim portion near the crown, or have the brim curved upwardly along the side to permit free passage of the radiation. For the female user, the solar cell can be moved to a forward position on the temple bow or mounted on the frontal piece 11, and thus receive the maximum benefit of the ambient actinic radiation.

From the pictorial representation of Figures 2 and 3 and schematic showing of Figure 4 it is evident that in the illustrated embodiment solar cell 32 actually comprises four individual series-connected cells. Such cells may be constructed of silicon and are commercially available in this form. When struck by even a small amount of actinic radiation, each cell produces a potential at its terminals; the maximum potential attained by the cells of the illustrated embodiment was 0.4 volt/cell. Accordingly, the series connection of the four cells provides a total potential of 1.6 volts across solar cell 32. When a re-chargeable 1.25 volt nickel-cadmium cell is used as the conventional battery 30, the generation of 1.6 volts by the solar cell is sufficient to operate the hearing aid circuit and simultaneously charge battery 30. In the normal course of events, the average person utilizing an eyeglass hearing aid embodying the solar cell will from time to time be exposed to actinic radiation of the level required to provide both hearing aid operation and battery re-charging. During the interim periods, the hearing aid is energized from battery 30 in conventional fashion.

The battery 30 is a low impedance device and thus does not cause "motor-boating" or other objectionable noise effects. The solar cell 32, however, is a high impedance cell and is accordingly bypassed by the electrolytic capacitor 26 to prevent "motor-boating." The capacitor 26 thus protects the user against such objectionable sounds when battery 30 is removed from the circuit. In the illustrated embodiment, the electrolytic capacitor 26 was an 80 microfarad capacitor. Because capacitor 26 was constructed for a terminal voltage of only four volts, its physical size was actually smaller than that illustrated in Figure 2.

As shown schematically in Figure 5, a re-charging circuit can be provided in parallel with solar cell 32. As there shown, a first re-chargeable energizing battery 30 is connected between power supply terminals 38 and 39 to energize the hearing aid circuit. In this embodiment the re-charging circuit is separate and distinct from the hearing aid power supply circuit, and includes solar cell 32 connected between terminals 38' and 39'; a second re-chargeable energizing battery 30' is connected between terminals 38' and 39' An electrolytic condenser is not necessary in the re-charging circuit, because solar cell 32 is not coupled to the hearing aid amplifier circuit. Instead, solar cell 32 opeartes, in response to the incidence of actinic radiation, only to charge the second cell 30'. After the potential supplied by battery 30 decreases below the level requisite to provide satisfactory operation of the hearing aid circuit, the positions of batteries 30 and 30' are interchanged. Battery 30' then energizes the hearing aid amplifier circuit while battery 30 is re-charged by solar cell 32. Re-chargeable batteries of the nickel-cadmium type may be re-charged repeatedly, and are suitable for use in the embodiment of Figure 5. The construction shown in Figure 2 can be modified in a manner obvious to those skilled in the art such that batteries 30 and 30' are received in the space between volume control 17 and microphone 31. Alternatively, the re-charging circuit can be disposed in one temple bow and the hearing aid circuit positioned in the other bow. Other modifications will doubtless be suggested to those skilled in the art.

The invention makes possible, for the first time, the re-charging of a conventional battery in an eyeglass hearing aid without the necessity of removing the battery or connecting the hearing aid to a charging apparatus. The solar cell has a built-in safety advantage, in that it can not supply such an excess of power that a damaging surge of charging current is produced. When more power than is required to operate the hearing-aid equipment is produced by the solar cell, the excess automatically charges battery 30. It has been found that the addition of the solar cell extends the life of conventional mercury batteries to a duration more than three times the average life span of such batteries. Even when the conventional battery is completely dead, the solar cell continues to energize the hearing aid whenever actinic radiation of a predetermined level strikes the solar cell.

In complete darkness, solar cell 32 draws a small current from battery 30. However, the cells of solar cell 32 are series-connected, and thus offer a high impedance to current flow. The current drawn by solar cell 32 in complete darkness has measured less than 5% of the current supplied to the hearing aid components.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A combined eyeglass hearing aid comprising: a spectacle frame, including a frontal piece for supporting eyeglass lenses and a pair of side temple bow members attached to said frontal piece, for supporting the hearing aid components; a re-chargeable battery mounted within one of said temple bow members for providing an operating potential; and a solar cell mounted on an exposed surface of one of said temple bow members and connected in parallel with said battery, said solar cell being operative in response to incident actinic radiation to develop an electrical operating potential and re-charge said battery.

2. A combined eyeglass hearing aid comprising: a spectacle frame including a frontal piece for supporting eyeglass lenses and a pair of side temple bow members attached to said frontal piece; a microphone and an electronic amplifier intercoupled and supported by said spectacle frame; a sound-reproducing device coupled to said electronic amplifier; and a power supply, comprising a solar cell responsive to incident actinic radiation for developing an electrical operating potential for energizing said amplifier, said solar cell being mounted on an exposed surface of one of said temple bow members.

3. A combined eyeglass hearing aid comprising: a spectacle frame including a frontal piece for supporting eyeglass lenses and a pair of side temple bow members attached to and extending rearwardly from said frontal piece; a hearing aid comprising a microphone, an electronic amplifier, and an energizing battery for said amplifier, all operatively interconnected and enclosed within one of said temple bow members; a sound-reproducing device coupled to said electronic amplifier; and a solar cell responsive to incident actinic radiation for developing electrical power at a voltage substantially equal to that of said battery, said solar cell being supported by said side temple bow member containing said hearing aid and being connected in parallel with said battery.

4. A combined eyeglass hearing aid comprising: a spectacle frame including a frontal piece for supporting eyeglass lenses and a pair of side temple bow members attached to and extending rearwardly from said frontal piece; a hearing aid comprising a microphone, an electronic amplifier, a sound-reproducing device, and an energizing battery for said amplifier, all operatively interconnected and enclosed within one of said temple bow members; an electrolytic capacitor connected in parallel with said battery; and a solar cell responsive to incident actinic radiation for developing electrical power at a voltage substantially equal to that of said battery, said solar cell being supported by said side temple bow member containing said hearing aid and being connected in parallel with said battery.

5. A combined eyeglass hearing aid comprising: a spectacle frame including a frontal piece for supporting eyeglass lenses and a pair of side temple bow members attached to and extending rearwardly from said frontal piece; a multi-stage transistor amplifier circuit enclosed within one of said temple bow members and having a pair of input terminals, a pair of output terminals, and a pair of power supply terminals; a microphone enclosed within said one temple bow member and coupled to said input terminals; a sound-reproducing device enclosed within said one temple bow member and coupled to said output terminals; a battery compartment in said one temple bow member containing a pair of battery contacts coupled to said power supply terminals and adapted to receive a low-impedance battery for energizing said multi-stage transistor amplifier; an electrolytic capacitor connected between said power supply terminals; and a high-impedance photovoltaic cell supported by said one temple bow member and exposed to ambient actinic radiation for developing power at a voltage corresponding to that of said battery, said photovoltaic cell being also coupled to said power supply terminals of said transistor amplifier, said transistor amplifier being energized independently by said photovoltaic cell and by said battery, and said photovoltaic cell re-charging said battery when the latter is in place in said battery compartment and actinic radiation strikes said photovoltaic cell.

6. A combined eyeglass hearing aid comprising: a spectacle frame including a frontal piece for supporting eyeglass lenses and a pair of side temple bow members attached to and extending rearwardly from said frontal piece; a hearing aid comprising a microphone, an electronic amplifier, and a first re-chargeable energizing battery for said amplifier, all operatively interconnected and enclosed within one of said temple bow members; a sound-reproducing device coupled to said electronic amplifier; a re-charging circuit enclosed within one of said temple bow members and including a second re-rechargeable energizing battery; and a solar cell responsive to incident actinic radiation for developing electrical power at a voltage substantially equal to that of said batteries, said solar cell being supported by one of said temple bow members and being connected in parallel with said second energizing battery.

7. A combined eyeglass hearing aid comprising: a spectacle frame including a frontal piece for supporting eyeglass lenses and a pair of side temple bow members attached to and extending rearwardly from said frontal piece; a hearing aid comprising a microphone, an electronic amplifier, and a first re-chargeable energizing battery for said amplifier, all operatively interconnected and enclosed within one of said temple bow members; a sound-reproducing device coupled to said electronic amplifier; a re-charging circuit, distinct from said hearing aid and enclosed within one of said temple bow members, including a second re-chargeable energizing battery; and a solar cell responsive to incident actinic radiation for developing electrical power at a voltage substantially equal to that of said batteries, said solar cell being supported by said side temple bow member containing said re-charging circuit and being connected in parallel with said second energizing battery.

No references cited.